(12) United States Patent
Strother

(10) Patent No.: US 8,986,490 B2
(45) Date of Patent: Mar. 24, 2015

(54) METHOD OF MANUFACTURING A COMPONENT

(75) Inventor: Oliver M. Strother, Nottingham (GB)

(73) Assignee: Rolls-Royce PLC, London (GB)

(*) Notice: Subject to any disclaimer, the term of this patent is extended or adjusted under 35 U.S.C. 154(b) by 749 days.

(21) Appl. No.: 13/299,671

(22) Filed: Nov. 18, 2011

(65) Prior Publication Data

US 2012/0135198 A1 May 31, 2012

(30) Foreign Application Priority Data

Nov. 26, 2010 (GB) .................................. 1020063.2

(51) Int. Cl.
*B29C 65/00* (2006.01)
*B32B 37/00* (2006.01)
(Continued)

(52) U.S. Cl.
CPC ............ *B21D 26/055* (2013.01); *B21D 26/021* (2013.01); *B21D 53/78* (2013.01);
(Continued)

(58) Field of Classification Search
CPC ........ B29C 53/00; B29C 53/16; B29C 53/18; B29C 63/00; B29C 63/0073; B29C 63/0082; B29C 63/0091; B29C 63/22; B29C 63/44; B29C 2063/006; B29C 65/00; B29C 65/70; B29C 66/00; B29C 66/001; B29C 66/00145; B32B 1/00; B32B 3/00; B32B 3/02; B32B 3/06; B32B 3/12; B32B 3/26; B32B 3/28; B32B 3/30; B32B 37/00; B32B 37/10; B32B 37/0076; B32B 37/1018; B32B 37/1009

USPC ............ 156/285, 286, 382; 264/87, 101, 102, 264/511, 526, 553, 571; 425/388, 405.1, 425/405.2, 504
See application file for complete search history.

(56) References Cited

U.S. PATENT DOCUMENTS 2,202,014 A 5/1940 Lougheed
3,111,747 A 11/1963 Johnson
(Continued)

FOREIGN PATENT DOCUMENTS

EP 0 130 583 A2 1/1985
EP 0 181 203 A2 5/1986
(Continued)

OTHER PUBLICATIONS

Jun. 29, 2012 Office Action issued in U.S. Appl. No. 12/654,504.
(Continued)

*Primary Examiner* — Richard Crispino
*Assistant Examiner* — Matthew Hoover
(74) *Attorney, Agent, or Firm* — Oliff PLC

(57) ABSTRACT

A method of manufacturing a component having first and second layers, the first and/or second layers including one or more depressions provided on a surface of the respective layer. The method including: arranging the first and second layers so that they face one another and with the depressions on inner facing surfaces of the layers; diffusion bonding the first and second layers together about their edges; applying a first differential pressure across each of the first and second layers to evacuate an inner space defined by the layers, thereby forming one or more depressions on an outer facing surface of the first or second layer; and applying a second differential pressure across each of the first and second layers to expand the inner space defined by the layers.

11 Claims, 1 Drawing Sheet

(51) Int. Cl.

| | | |
|---|---|---|
| *B28B 1/26* | (2006.01) | |
| *B29C 47/76* | (2006.01) | |
| *B29C 45/00* | (2006.01) | |
| *B29C 47/00* | (2006.01) | |
| *B29C 39/02* | (2006.01) | |
| *B29C 43/02* | (2006.01) | |
| *B29C 49/00* | (2006.01) | |
| *B29C 49/08* | (2006.01) | |
| *B29C 67/00* | (2006.01) | |
| *B29D 22/00* | (2006.01) | |
| *B29C 51/00* | (2006.01) | |
| *B29D 24/00* | (2006.01) | |
| *B29D 29/00* | (2006.01) | |
| *B29C 43/10* | (2006.01) | |
| *A01J 21/00* | (2006.01) | |
| *A01J 25/12* | (2006.01) | |
| *A21C 3/00* | (2006.01) | |
| *A21C 11/00* | (2006.01) | |
| *A23G 1/20* | (2006.01) | |
| *A23G 3/02* | (2006.01) | |
| *A23P 1/00* | (2006.01) | |
| *B28B 11/08* | (2006.01) | |
| *B28B 21/36* | (2006.01) | |
| *B29C 55/28* | (2006.01) | |
| *B21D 26/055* | (2011.01) | |
| *B21D 26/021* | (2011.01) | |
| *B21D 53/78* | (2006.01) | |
| *B23K 20/02* | (2006.01) | |
| *B23K 20/18* | (2006.01) | |
| *B23P 15/04* | (2006.01) | |
| *F01D 5/14* | (2006.01) | |
| *F01D 5/18* | (2006.01) | |

(52) U.S. Cl.
CPC .............. *B23K 20/021* (2013.01); *B23K 20/18* (2013.01); *B23P 15/04* (2013.01); *F01D 5/147* (2013.01); *F01D 5/18* (2013.01); *B23K 2201/001* (2013.01); *F05D 2230/236* (2013.01); *F05D 2260/96* (2013.01); *Y02T 50/672* (2013.01); *Y02T 50/676* (2013.01)
USPC .............. 156/285; 156/286; 156/382; 264/87; 264/511; 264/526; 264/553; 264/571; 264/101; 264/102; 425/388; 425/405.1; 425/405.2; 425/504

(56) References Cited

U.S. PATENT DOCUMENTS

| | | | |
|---|---|---|---|
| 3,736,638 A | | 6/1973 | Stone, Jr. |
| 3,927,817 A | * | 12/1975 | Hamilton et al. .............. 228/157 |
| 4,217,397 A | | 8/1980 | Hayase et al. |
| 4,292,375 A | | 9/1981 | Ko |
| 4,304,821 A | | 12/1981 | Hayase et al. |
| 4,331,284 A | | 5/1982 | Schulz et al. |
| 4,522,860 A | | 6/1985 | Scott et al. |
| 4,530,197 A | | 7/1985 | Rainville |
| 4,583,914 A | | 4/1986 | Craig et al. |
| 4,642,863 A | | 2/1987 | Schulz |
| 4,655,014 A | | 4/1987 | Krecke |
| 4,811,890 A | | 3/1989 | Dowling et al. |
| 4,882,823 A | | 11/1989 | Weisert et al. |
| 5,007,225 A | | 4/1991 | Teasdale |
| 5,119,531 A | | 6/1992 | Berger et al. |
| 5,143,276 A | | 9/1992 | Mansbridge et al. |
| 5,240,376 A | | 8/1993 | Velicki |
| 5,243,758 A | | 9/1993 | LeMonds et al. |
| 5,253,419 A | | 10/1993 | Collot et al. |
| 5,323,953 A | | 6/1994 | Adderley et al. |
| 5,330,092 A | | 7/1994 | Gregg et al. |
| 5,384,959 A | | 1/1995 | Velicki |
| 5,419,039 A | | 5/1995 | Auxier et al. |
| 5,469,618 A | | 11/1995 | LeMonds et al. |
| 5,534,354 A | | 7/1996 | Gregg et al. |
| 5,544,805 A | | 8/1996 | Alassoeur et al. |
| 5,570,552 A | | 11/1996 | Nehring |
| 5,692,881 A | * | 12/1997 | Leibfried ...................... 416/233 |
| 5,723,225 A | | 3/1998 | Yasui et al. |
| 5,821,506 A | | 10/1998 | Matsen |
| 5,826,332 A | | 10/1998 | Bichon et al. |
| 5,881,459 A | | 3/1999 | Yasui |
| 5,941,446 A | | 8/1999 | Yasui |
| 6,039,542 A | | 3/2000 | Schilling et al. |
| 6,139,278 A | | 10/2000 | Mowbray et al. |
| 6,224,341 B1 | | 5/2001 | Fricke |
| 6,287,080 B1 | | 9/2001 | Evans et al. |
| 6,331,217 B1 | * | 12/2001 | Burke et al. ................... 148/522 |
| 6,419,146 B1 | | 7/2002 | Buldhaupt et al. |
| 6,467,168 B2 | | 10/2002 | Wallis |
| 6,669,447 B2 | | 12/2003 | Norris et al. |
| 6,720,087 B2 | | 4/2004 | Fried et al. |
| 6,893,211 B1 | | 5/2005 | Eibl et al. |
| 6,979,180 B2 | | 12/2005 | Motherwell |
| 6,986,940 B1 | | 1/2006 | Carper |
| 7,025,568 B2 | | 4/2006 | Jones |
| 7,070,390 B2 | | 7/2006 | Powell |
| 7,144,222 B2 | | 12/2006 | Lanni et al. |
| 7,247,003 B2 | | 7/2007 | Burke et al. |
| 7,311,500 B2 | | 12/2007 | Rongong et al. |
| 7,406,849 B2 | | 8/2008 | Ueno et al. |
| 7,431,197 B2 | | 10/2008 | Franchet et al. |
| 7,470,114 B2 | | 12/2008 | Bonnet |
| 7,753,654 B2 | | 7/2010 | Read et al. |
| 8,382,441 B2 | | 2/2013 | Brennand et al. |
| 2002/0014101 A1 | | 2/2002 | Yajima |
| 2003/0136815 A1 | | 7/2003 | Debaisieux et al. |
| 2003/0156942 A1 | | 8/2003 | Villhard |
| 2003/0164255 A1 | | 9/2003 | Borroni-Bird et al. |
| 2004/0018091 A1 | | 1/2004 | Rongong et al. |
| 2004/0191069 A1 | | 9/2004 | Motherwell |
| 2006/0066133 A1 | | 3/2006 | Ueno et al. |
| 2006/0255098 A1 | | 11/2006 | Runyan |
| 2007/0065291 A1 | | 3/2007 | Karafillis |
| 2007/0243070 A1 | | 10/2007 | Matheny |
| 2007/0243408 A1 | | 10/2007 | Straza |
| 2008/0025846 A1 | | 1/2008 | Vance et al. |
| 2009/0057488 A1 | | 3/2009 | Goldfinch et al. |
| 2009/0057489 A1 | | 3/2009 | Goldfinch et al. |
| 2009/0057718 A1 | | 3/2009 | Suvorov et al. |
| 2009/0060718 A1 | | 3/2009 | Goldfinch et al. |
| 2009/0304517 A1 | | 12/2009 | Strother |
| 2010/0021693 A1 | | 1/2010 | Goldfinch et al. |
| 2010/0186215 A1 | | 7/2010 | Jones et al. |

FOREIGN PATENT DOCUMENTS

| | | |
|---|---|---|
| EP | 0 209 867 A2 | 1/1987 |
| EP | 0 358 523 A1 | 3/1990 |
| EP | 0 418 179 A1 | 3/1991 |
| EP | 0 469 221 A1 | 2/1992 |
| EP | 0 354 631 B1 | 6/1992 |
| EP | 0 500 458 A1 | 8/1992 |
| EP | 0 520 827 A2 | 12/1992 |
| EP | 0 527 564 A1 | 2/1993 |
| EP | 0 549 172 A1 | 6/1993 |
| EP | 0 555 534 A2 | 8/1993 |
| EP | 0 582 795 A1 | 2/1994 |
| EP | 0 594 885 A1 | 5/1994 |
| EP | 0 765 711 A1 | 4/1997 |
| EP | 0 716 273 B1 | 3/1998 |
| EP | 0 926 312 A2 | 6/1999 |
| EP | 1 013 355 A2 | 6/2000 |
| EP | 1 085 288 A1 | 3/2001 |
| EP | 0 594 886 B1 | 7/2001 |
| EP | 1 160 752 A1 | 12/2001 |
| EP | 1 184 768 A2 | 3/2002 |
| EP | 1 024 330 B1 | 11/2002 |
| EP | 0 886 813 B1 | 1/2003 |

(56) References Cited

FOREIGN PATENT DOCUMENTS

| | | |
|---|---|---|
| EP | 1 327 489 A1 | 7/2003 |
| EP | 1 355 212 A1 | 10/2003 |
| EP | 1 433 993 A1 | 6/2004 |
| EP | 1 460 347 A1 | 9/2004 |
| EP | 1 460 507 A2 | 9/2004 |
| EP | 1 466 692 A1 | 10/2004 |
| EP | 1 491 980 A2 | 12/2004 |
| EP | 1 541 953 A1 | 6/2005 |
| EP | 1 561 901 A2 | 8/2005 |
| EP | 1 160 640 B1 | 2/2006 |
| EP | 1 653 165 A1 | 5/2006 |
| EP | 1 811 129 A2 | 7/2007 |
| EP | 2 014 384 A1 | 1/2009 |
| EP | 2 014 386 A1 | 1/2009 |
| EP | 2 014 387 A1 | 1/2009 |
| EP | 2 014 388 A1 | 1/2009 |
| EP | 2 014 869 A1 | 1/2009 |
| EP | 2 119 871 A2 | 11/2009 |
| EP | 2 147 731 A1 | 1/2010 |
| EP | 2 223 766 A1 | 9/2010 |
| GB | 842937 A | 7/1960 |
| GB | 1 367 958 A | 9/1974 |
| GB | 1 437 510 A | 5/1976 |
| GB | 2 124 520 A | 2/1984 |
| GB | 2 154 287 A | 9/1985 |
| GB | 1 284 867 A | 7/1987 |
| GB | 2 193 306 A | 2/1988 |
| GB | 2 198 264 A | 6/1988 |
| GB | 2 202 619 A | 9/1988 |
| GB | 2 206 685 A | 1/1989 |
| GB | 2 211 593 A | 7/1989 |
| GB | 2 228 069 A | 8/1990 |
| GB | 2 249 615 A | 5/1992 |
| GB | 2 251 063 A | 6/1992 |
| GB | 2 261 032 A | 5/1993 |
| GB | 2 298 265 A | 8/1996 |
| GB | 2 305 720 A | 4/1997 |
| GB | 2 360 070 A | 9/2001 |
| GB | 2 371 095 A | 7/2002 |
| GB | 2 387 669 A | 10/2003 |
| GB | 2 391 270 A | 2/2004 |
| GB | 2 393 498 A | 3/2004 |
| GB | 2 397 855 A | 8/2004 |
| GB | 2 401 407 A | 11/2004 |
| GB | 2 402 716 A | 12/2004 |
| GB | 2 408 295 A | 5/2005 |
| GB | 2 411 462 A | 8/2005 |
| GB | 2 416 228 A | 1/2006 |
| GB | 2 438 185 A | 11/2007 |
| GB | 2 450 934 A | 1/2009 |
| GB | 2 450 935 A | 1/2009 |
| JP | A-2008-133825 | 6/2008 |
| WO | WO 97/27045 A2 | 7/1997 |
| WO | WO 00/70271 A1 | 11/2000 |
| WO | WO 01/56332 A1 | 8/2001 |
| WO | WO 01/82018 A2 | 11/2001 |
| WO | WO 02/48615 A2 | 6/2002 |
| WO | WO 03/025469 A1 | 3/2003 |
| WO | WO 03/042607 A1 | 5/2003 |
| WO | WO 03/093916 A2 | 11/2003 |
| WO | WO 2004/102077 A1 | 11/2004 |
| WO | WO 2005/022953 A1 | 3/2005 |
| WO | WO 2005/045326 A1 | 5/2005 |
| WO | WO 2005/067619 A2 | 7/2005 |
| WO | WO 2005/069820 A2 | 8/2005 |
| WO | WO 2005/071510 A1 | 8/2005 |

OTHER PUBLICATIONS

Office Action issued in U.S. Appl. No. 12/216,505 mailed Sep. 6, 2012.
Sep. 16, 2013 European Search Report issued in European Patent Application No. EP 10 17 0940.
Oct. 10, 2013 Office Action issued in U.S. Appl. No. 12/216,505.
Jun. 18, 2014 Office Action issued in U.S. Appl. No. 13/186,850.
Feb. 21, 2013 Office Action issued in U.S. Appl. No. 12/216,505.
Jun. 20, 2013 Office Action issued in U.S. Appl. No. 12/730,641.
Jul. 9, 2013 Notice of Allowance issued in U.S. Appl. No. 12/453,762.
Aug. 21, 2013 Office Action issued in U.S. Appl. No. 12/796,231.
Mar. 7, 2012 Office Action issued in U.S. Appl. No. 12/453,435.
Office Action issued in U.S. Appl. No. 12/216,505; mailed Mar. 20, 2012.
Notice of Allowance issued in U.S. Appl. No. 12/216,503; mailed Mar. 12, 2012.
Notice of Allowance issued in U.S. Appl. No. 12/216,502; mailed Mar. 9, 2011.
Jul. 14, 2014 Notice of Allowance issued in U.S. Appl. No. 12/216,497.
Dec. 2, 2013 Office Action issued in U.S. Appl. No. 12/730,641.
Jan. 17, 2013 Office Action issued in U.S. Appl. No. 12/654,211.
Sep. 2, 2009 European Search Report issued in European Application No. 09 25 1341.
Dec. 14, 2010 Search Report issued in British Application No. GB1020063.2.
Jul. 28, 2009 Search Report issued in British Patent Application No. 0907004.6.
Jul. 27, 2010 Search Report issued in European Patent Application No. EP 10 15 7495.2.
Jan. 19, 2010 Search Report issued in British Patent Application No. 0916687.7.
May 19, 2010 European Search Report issued in European Patent Application No. 09252779.5 (with Abstract).
May 5, 2009 British Search Report issued in related British Patent Application No. GB0901235.2.
Mar. 18, 2009 British Search Report issued in British Patent Application No. GB0901318.6.
Oct. 7, 2008 European Search Report issued in European Patent Application No. 08 01 1077.
Oct. 20, 2008 European Search Report issued in European Patent Application No. 08 01 1078.
Oct. 21, 2008 European Search Report issued in European Patent Application No. 08 01 1079.
Dec. 7, 2010 Search Report issued in British Application No. GB1013305.6.
Sep. 2, 2010 Search Report issued in British Application No. GB1009216.1.
Sep. 15, 2009 Search Report issued in British Application No. GB0911416.6.
May 11, 2011 Partial European Search Report issued in European Application No. 10 16 5255.
Sep. 22, 2008 Search Report issued in British Application No. GB0808840.3.
Aug. 28, 2007 Search Report issued in British Application No. GB0713700.3.
Sep. 16, 2008 Search Report issued in British Application No. GB0813539.4.
Mar. 7, 2008 Search Report issued in British Application No. GB0713699.7.
Oct. 12, 2007 Search Report issued in British Application No. GB0713699.7.
Jul. 26, 2011 Office Action issued in U.S. Appl. No. 12/453,762.
Sep. 12, 2011 Office Action issued in U.S. Appl. No. 12/453,762.
Dec. 21, 2011 Notice of Allowance issued in U.S. Appl. No. 12/453,762.
Jul. 1, 2011 Office Action issued in U.S. Appl. No. 12/216,503.
Dec. 27, 2011 Notice of Allowance issued in U.S. Appl. No. 12/216,503.
Sep. 26, 2011 Office Action issued in U.S. Appl. No. 12/453,435.
Feb. 25, 2011 Office Action issued in U.S. Appl. No. 12/216,505.
Jun. 2, 2011 Office Action issued in U.S. Appl. No. 12/216,505.
Nov. 23, 2011 Office Action issued in U.S. Appl. No. 12/216,505.
Feb. 3, 2011 Office Action issued in U.S. Appl. No. 12/216,497.
Jul. 20, 2011 Office Action issued in U.S. Appl. No. 12/216,497.
Mar. 9, 2011 Notice of Allowance issued in U.S. Appl. No. 12/216,502.
Dec. 6, 2010 Office Action issued in U.S. Appl. No. 12/216,502.

(56) References Cited

OTHER PUBLICATIONS

U.S. Appl. No. 12/654,504 in the name of Jones et al., filed Dec. 22, 2009.
U.S. Appl. No. 12/645,211 in the name of Strother, filed Dec. 14, 2009.
U.S. Appl. No. 12/844,215 in the name of Harron, filed Jul. 27, 2010.
U.S. Appl. No. 12/730,641 in the name of Strother, filed Mar. 24, 2010.
U.S. Appl. No. 12/216,503 in the name of Goldfinch et al, filed Jul. 7, 2008.
U.S. Appl. No. 13/186,850 in the name of Goldfinch et al, filed Jul. 20, 2011.
U.S. Appl. No. 13/114,382 in the name of Strother, filed May 24, 2010.
U.S. Appl. No. 12/453,762 in the name of Goldfinch, filed May 21, 2009.
U.S. Appl. No. 12/216,505 in the name of Strother, filed Jul. 7, 2008.
U.S. Appl. No. 12/453,435 in the name of Strother, filed May 11, 2009.
U.S. Appl. No. 12/796,231 in the name of Mason, filed Jun. 8, 2010.
U.S. Appl. No. 13/008,323 in the name of Strother, filed Jan. 18, 2011.
U.S. Appl. No. 12/720,253 in the name of Strother, filed Mar. 9, 2010.
U.S. Appl. No. 12/720,351 in the name of Strother, filed Mar. 9, 2010.
U.S. Appl. No. 12/216,502 in the name of Goldfinch et al., filed Jul. 7, 2008.
U.S. Appl. No. 12/216,497 in the name of Goldfinch et al., filed Jul. 7, 2008.
Feb. 10, 2014 Office Action issued in U.S. Appl. No. 13/186,850.
Apr. 17, 2014 Office Action issued in U.S. Appl. No. 12/654,211.
Office Action issued in U.S. Appl. No. 12/216,502; mailed Apr. 16, 2012.
Dec. 6, 2013 Search Report issued in European Patent Application No. EP 11 17 4688.

\* cited by examiner

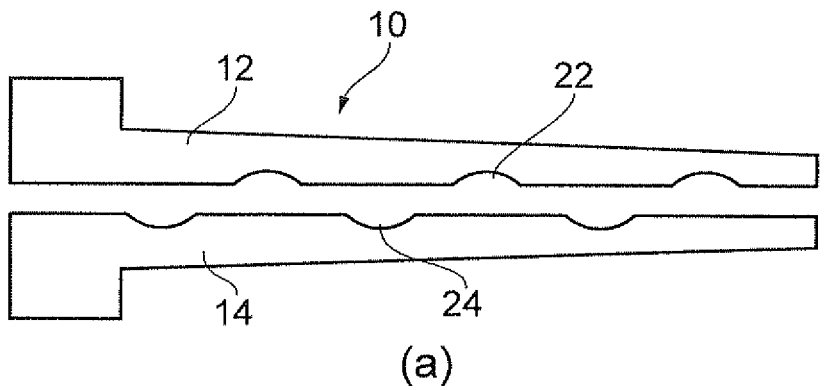
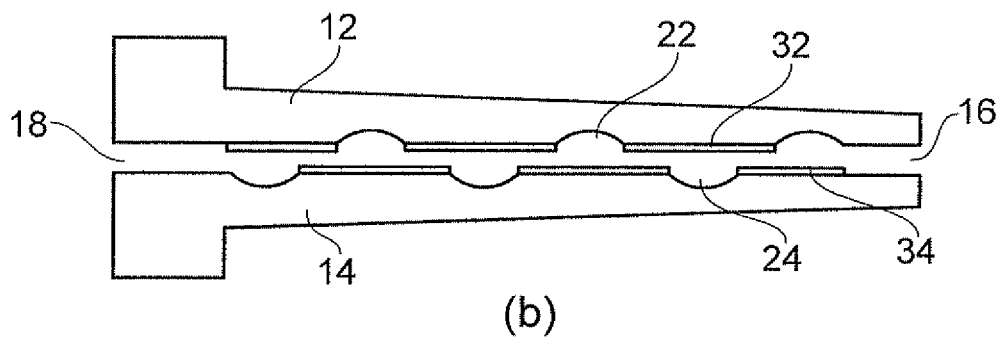
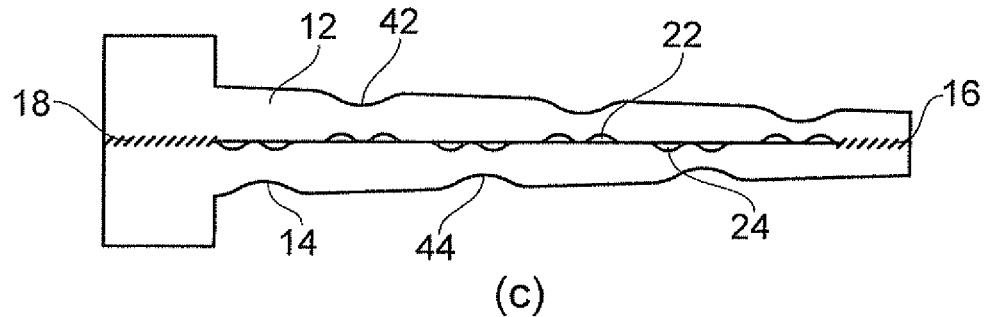
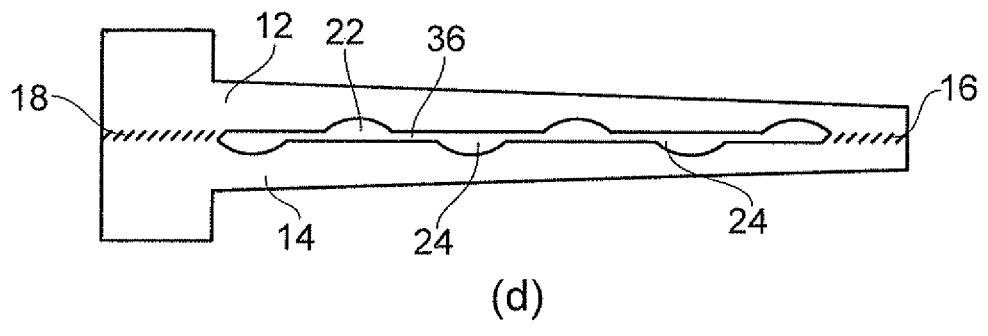

METHOD OF MANUFACTURING A COMPONENT

This invention relates to a method of manufacturing a component comprising an internal structure, and particularly but not exclusively relates to applications of the method in hollow aerofoil components for turbomachines.

BACKGROUND

It is known to manufacture hollow metallic aerofoils for example to be used as blades in a jet engine, and in particular fan blades for a turbomachine, by diffusion bonding metallic panels and inflating the volume formed between the panels, the panels forming pressure and suction surfaces of the blade. Such structures are widely used in the civil aerospace industry, for example in wide-chord fan blades, and may also be used in blinks (i.e. bladed disks), particularly in military applications. The metallic panels may include elementary metal, metal alloys and metal matrix composites and at least one of the metallic panels may be capable of superplastic extension. In one known process the surfaces of the panels to be joined are cleaned, and at least one surface of one or more of the panels is coated in preselected areas with a stop-off material to prevent diffusion bonding. The panels are arranged in a stack and the edges of the panels are welded together, except where a pipe is welded to the panels, to form an assembly. The pipe enables a vacuum, or inert gas pressure, to be applied to the interior of the assembly. The assembly is placed in an autoclave and heated so as to "bake out" the binder from the material to prevent diffusion bonding. The assembly is then evacuated, using the pipe, and the pipe is sealed. The sealed assembly is placed in a pressure vessel and is heated and pressed to diffusion bond the panels together to form an integral structure. Diffusion bonding occurs when two surfaces are pressed together under temperature, time and pressure conditions that allow atom interchange across the interface. The first pipe is removed and a second pipe is fitted to the diffusion bonded assembly at the position where the first pipe was located. The integral structure is located between appropriately shaped dies and is placed within an autoclave. The integral structure and dies are heated and pressurised fluid is supplied through the second pipe into the interior of the integral structure to cause at least one of the panels to be blow formed to produce an article matching the shape of the dies. If either of the panels exhibit superplastic characteristics it is usual for the inflation to occur at the temperature at which the panel is in its superplastic condition.

The assembly may be filled or part filled by a suitable material to provide damping of the structure and therefore to reduce vibration. A suitable material may be one which possesses viscoelastic properties. Viscoelasticity is a property of a solid or liquid which when deformed exhibits both viscous and elastic behaviour through the simultaneous dissipation and storage of mechanical energy. A known method is to introduce a viscoelastic material, for example a Huntsman™ syntactic damping material or a similar product, or non-syntactic material, into the cavity by injecting or otherwise introducing the material into some or all of the cavity. This technique may be applied in a hollow assembly wherein the cavity is smooth walled with no internal structure, see GB2371095 for example. In this configuration the viscoelastic material is restrained solely by the bond between the viscoelastic material and the walls of the cavity. If this bond is not sufficient to retain the viscoelastic material during working conditions, in particular due to centrifugal loading, then, since the viscoelastic material is a parasitic mass which is unable to support its own weight, the hydrostatic load of the unrestrained material will cause the blade to fail rapidly. Accordingly, the consequences of failure of this bond are severe.

It is therefore desirable to provide some form of means for retaining and restraining the viscoelastic material. An internal structure, e.g. a Warren girder type structure, may be used to provide such a restraining or retaining effect on the injected material. However, by providing a rigid internal structure the benefits of damping the aerofoil may be reduced as the aerofoil is less flexible as a result of the internal structure. This may lead to additional problems where the aerofoil prematurely fatigues or cracks as a result of the reduced flexibility. Other configurations use internal ribs, which may be attached to alternate interior walls of the aerofoil but which are not connected to one another, see for example patent application number GB0713699.7. This configuration permits damping of the assembly whilst the re-entrant features still provide a means of retaining the injected material. However, this internal configuration is complex and difficult to manufacture.

Furthermore, the use of an internal structure to physically restrain the viscoelastic material inevitably adds weight to the aerofoil and thus increases the stresses on the aerofoil, in particular at the root of the aerofoil. This increases the blade off energy if the blade were to fail, which must be taken into account when designing the blade retention system. In addition, the provision of complex internal structures increases manufacturing costs and lead times. It is therefore desirable to provide an improved method of restraining a viscoelastic material within a cavity which addresses some or all of the above problems associated with the prior art methods.

STATEMENTS OF INVENTION

According to a first aspect of the present invention there is provided a method of manufacturing a component, e.g. by superplastic forming and diffusion bonding, wherein the component comprises first and second layers, the first and/or second layers comprising one or more features, e.g. depressions, provided on a surface of the respective layer, and wherein the method comprises: arranging the first and second layers so that they face one another and with the features on inner facing surfaces of the layers; bonding, e.g. diffusion bonding or welding, the first and second layers together about their edges; applying a first differential pressure across each of the first and second layers to evacuate an inner space defined by the layers such that the layers are deformed with the features on the inner facing surface at least partially translated to an outer facing surface of the first or second layer, thereby forming one or more features on an outer facing surface of the first or second layer; and applying a second differential pressure across each of the first and second layers to inflate the inner space defined by the layers such that the layers are deformed with the features on the outer facing surface at least partially translated back to the inner facing surface of the first or second layer.

The method may further comprise applying a stop-off material in a predetermined pattern to the inner facing surfaces of the first and/or second layers. The stop-off material may prevent a diffusion bond from forming between the first and second layers across regions defined by said predetermined pattern. The stop-off material may be applied in regions outside of the one or more depressions.

Both the first and second layers may comprise the one or more depressions. The depressions on the first and second layers may be arranged so that they do not overlap with the depressions on an opposing layer.

A damping material may be provided in the inner space between the first and second layers. The method may further comprise injecting the damping material into the inner space between the first and second layers.

The depressions may be elongate. The depressions may form one or more rows. Alternatively, the depressions may possess rotational symmetry, e.g. they may comprise one or more spots.

The method may further comprise heating and pressing the first and second layers to diffusion bond the first and second layers together to form an integral structure. The method may further comprise one or more of: placing the first and second layers between appropriately shaped dies; heating the first and second layers and dies; and supplying a pressurised fluid between the first and second layers to cause at least one of the first and second layers to be superplastically formed. The method may further comprise finishing the outer facing surfaces of the first and/or second layers, e.g. by polishing, grinding or any other known finishing technique.

According to a second aspect of the present invention there is provided a component manufactured according to the aforementioned method. The component may be an aerofoil structure for a turbomachine. A turbomachine may comprise the component.

BRIEF DESCRIPTION OF THE DRAWINGS

For a better understanding of the present invention, and to show more clearly how it may be carried into effect, reference will now be made, by way of example, to the accompanying drawings, in which:—

FIGS. 1(a)-(d) show a selection of the method steps involved in manufacturing a component according to an example of the present disclosure.

DETAILED DESCRIPTION

With reference to FIGS. 1(a)-(d), a component 10 according to the present invention comprises a first layer 12 and a second layer 14, which may be arranged side by side. For example, the present invention may specifically relate to the internal core of a hollow fan blade and FIG. 1(a) shows a root to tip section through two un-bonded fan blade panels. The first and second layers 12, 14 may be made from titanium.

The first and/or second layers 12, 14 may comprise one or more features, e.g. depressions 22, 24, on inner facing surfaces of the first and second layers 12, 14 respectively. By contrast, the outer facing surfaces of the first and second layers 12, 14 may be substantially smooth. As shown, both the first and second layers 12, 14 may comprise the one or more depressions 22, 24. The depressions 22, 24 may be arranged on one of the first and second layers 12, 14 so that they do not overlap with the depressions 22, 24 on the other of the first and second layers. Furthermore, opposing depressions 22, 24 may be radially spaced apart. In other words, the depressions 22 on the first layer may be smaller than the spacing between the depressions 24 on the second layer and vice-versa.

As depicted, the depressions 22, 24 may be rounded in cross-section, e.g. partially oval, elliptical or circular shaped, or they may alternatively be straight edged in cross-section, e.g. triangular, rectangular or trapezium shaped. The depressions 22, 24 may extend in a longitudinal direction, i.e. into the page as shown in FIG. 1. Alternatively, the depressions may possess rotational symmetry, e.g. they may be square or circular shaped, and there may be a plurality of depressions extending into the page as shown in FIG. 1.

In the case of the component 10 being an aerofoil structure, the depressions 22, 24 on the first and second layers 12, 14 may correspond to ribs, which extend in a spanwise direction, i.e. from the leading edge to the trailing edge of the aerofoil structure. However, the depressions 22, 24 may alternatively be orientated as ridges running in a radial direction or they may be a plurality of spots, rings or dimple like shapes.

The inner and outer surfaces of the first and second layers 12, 14 may be generated using a machining process, or any other material removal or material addition methods, including conventional methods of manufacture such as machining or forging, or non-conventional methods of manufacture such as chemical machining or metal deposition.

With reference to FIG. 1(b), prior to bonding the first and second layers 12, 14 to each other, a stop-off material 32, 34 may be applied in preselected areas between the first layer 12 and second layer 14. The stop-off material 32, 34 prevents a diffusion bond from occurring between said layers across the preselected areas. The stop-off material 32 may be applied to the inner facing surface of the first layer 12 in regions opposing the depressions 24 in the inner facing surface of the second layer 14. In addition or alternatively, the stop-off material 34 may be applied to the inner facing surface of the second layer 14 in regions opposing the depressions 22 in the inner facing surface of the first layer 12. In other words, the stop-off material may be applied in regions outside of the one or more depressions 22, 24 (i.e. where there are no depressions in the first and second layers). The stop-off material may not be applied about edges 16, 18 and the remaining edges about the component's perimeter (not shown).

With reference to FIG. 1(c) once the stop-off material 32, 34 has been applied, the layers 12, 14 are stacked together and heat and pressure, e.g. hot isostatic pressure, are applied via dies (not shown). A diffusion bond may be formed between the respective layers, except that a diffusion bond may not be formed where the stop-off material has been applied. A diffusion bond may be formed about the edges 16, 18 as shown and the remaining edges (not shown) of the first and second layers 12, 14.

Referring still to FIG. 1(c), a first differential pressure, e.g. a vacuum, may be applied between inside and outside the component 10. The first differential pressure may evacuate an inner space defined by the first and second layers 12, 14. The first and second layers 12, 14 may be deformed by the first differential pressure, with the depressions 22, 24 on the inner facing surfaces of the first and second layers at least partially being translated to an outer facing surface of the first or second layers. As a result one or more depressions 42, 44 on an outer facing surface of the first or second layer may be formed. In other words the material surrounding the depressions 22, 24 is collapsed or sucked in by the first differential pressure such that the depressions move from the inner surfaces of the first and/or second layers to the outer surfaces. As shown in FIG. 1(c), a portion of the inner facing depressions 22, 24 may remain after the first differential pressure has been applied.

With reference to FIG. 1(d) once the diffusion bonds have been formed between the respective layers, a second differential pressure may be applied between inside and outside the component 10. The second differential pressure may inflate the inner space defined by the first and second layers 12, 14 and the first and second layers may be inflated between hot forming dies to re-form the internal shape and form the external shape of the component 10. Pressurised fluid (typically Argon) is supplied into the interior of the component 10 to cause at least one of the layers to be blown to produce a component matching the shape of the dies. The component 10 may also be twisted into shape during or after the inflation.

Referring still to FIG. 1(*d*), the second pressure differential may deform the first and second layers 12, 14 such that the material which had translated into the inner facing depressions 22, 24 is translated back out to the outer facing surfaces of the first and second layers. In other words, the depressions 42, 44 on the outer facing surfaces may be at least partially translated back to the inner facing surface of the first or second layer. The depressions 22, 24 on the inner facing surfaces of the first and second layers may therefore be substantially reformed. Accordingly, the high pressure fluid acting on the inner facing surfaces of the first and second layers 12, 14 may be sufficient to cause the depressions 42, 44 to be blown out. The first and second layers 12, 14 may be deformed such that the outer facing surfaces of the first and second layers 12, 14 are substantially smooth with the depressions 22, 24 having been transferred to the inner facing surfaces of the first and second layers. In addition, the high pressure fluid also creates a gap 36 between the first and second layers 12, 14 as the component 10 is expanded into the dies.

In summary, the present invention comprises collapsing and re-inflating the first and second layers of the component in order to create the desired geometry.

Once the component 10 is inflated by a high pressure fluid, the gap 36 may be filled with a damping material (not shown). The damping material may be a polymer, for example, a viscoelastic material, e.g. a Huntsman™ syntactic damping material, or a similar product, or a non-syntactic damping material. The internal cavity shape is defined in such a way that it prevents the internal media moving or viscously creeping inside the blade under extreme centrifugal load.

Once fully formed, the external geometry of the component 10 may be finished as necessary, e.g. by polishing, grinding or any other finishing process.

The present invention allows the component, e.g. aerofoil structure, to flex in all directions and transmit shear forces via the depressions to the internal damping material. By contrast, previously-proposed arrangements, which comprise a connector between the two layers, may not flex evenly or enable the inclusion of damping media. Furthermore, the present invention may prevent the layers of the component, e.g. aerofoil structure, from separating or delaminating. The present invention aids in preventing delamination of the damping media from the internal structure during impact or normal running stresses by having the filler mechanically linked to the internal depressions in each panel, whilst also optimising the weight of the design.

Advantageously, with the present invention the internal surface geometry may be clearly defined prior to assembly of the component, whilst ensuring the post hot forming inflation cycle generates a smooth external component shape. The post hot forming machining cycles are also minimised as a result.

The present invention also has an advantage over symmetrical core designs, as the flat surface opposite each depression allows for low cost silk screen printing to be used to apply stop off materials, in place of complex 3D inkjet style printing.

In addition, because the inner facing surfaces of the first and second layers are initially generated directly, a high fidelity of shape is achievable in the internal surface. By contrast, shape losses occur for features which are not initially generated and are only transferred through the layers.

Other advantages include a reduction in manufacturing cost due to reduced die wear associated with feature transfer, since prominent external features increase hot forming die wear.

The present invention has been shown for use in an entire cavity, however it may be used in a particular area or region of a large cavity, for example acting as a patch. The component 10 may be a blade for a turbomachine, for example a compressor fan blade. The first layer 12 and second layer 14 may form the suction and pressure surfaces of a blade respectively or vice-versa. The component 10 may be orientated so that the depressions 22, 24 are disposed in a radial direction of the turbomachine blade. Alternatively, the component 10 may be orientated so that the depressions 22, 24 are disposed in a circumferential direction. In either case, the assembly described above may be repeated in the chord-wise direction and/or span-wise direction.

The present invention may be used in any component where the retention of a damping media or other material is required to be held in place. This may include rotating or static components. The present invention may also be applied to similar structures, which may comprise additional layers, e.g. membranes. The present invention may also comprise the inclusion of a material addition process, forming even more complicated geometries.

The present invention may be adapted for use in most hollow structure applications, in particular the internal geometry of fan blades for all types of engine (civil, military, power generation and other related applications). Examples of possible structures include: internal enclosed or vented cavities within hollow civil or military fan blades; internal enclosed or vented cavities within hollow civil or military blisks; and vibration damped static components. The present invention may be used in any field where a hollow structure is supported internally, for example to damp vibrations and/or withstand impacts. By way of example, such structures may include fan blades, containment rings, damped rotating structures, hollow structures and outlet guide vanes.

The invention claimed is:

1. A method of manufacturing a component, wherein the component comprises first and second layers, the first and/or second layers comprising one or more depressions provided on a surface of the respective layer, wherein the method comprises:

arranging the first and second layers so that they face one another and with the depressions on inner facing surfaces of the layers;

bonding the first and second layers together about their edges;

applying a first differential pressure across each of the first and second layers to evacuate an inner space defined by the layers such that the layers are deformed with the depressions on the inner facing surface at least partially translated to an outer facing surface of the first or second layer, thereby forming one or more depressions on an outer facing surface of the first or second layer; and applying a second differential pressure across each of the first and second layers to inflate the inner space defined by the layers such that the layers are deformed with the depressions on the outer facing surface at least partially translated back to the inner facing surface of the first or second layer.

2. The method of manufacture according to claim 1, wherein the method further comprises:

applying a stop-off material in a predetermined pattern to the inner facing surfaces of the first and/or second layers so as to prevent a diffusion bond from forming between the first and second layers across regions defined by said predetermined pattern.

3. The method of manufacture according to claim 2, wherein the method further comprises applying the stop-off material in regions outside of the one or more depressions.

4. The method of manufacture according to claim 1, wherein both the first and second layers comprise the one or more depressions and the method further comprises arranging the depressions on the first and second layers so that the depressions do not overlap with one another.

5. The method of manufacture according to claim 1, wherein the method further comprises providing a damping material in the inner space between the first and second layers.

6. The method of manufacture according to claim 5, wherein the method further comprises injecting the damping material into the inner space between the first and second layers.

7. The method of manufacture according to claim 1, wherein the depressions are elongate such that the depressions form one or more rows.

8. The method of manufacture according to claim 1, wherein the depressions possess rotational symmetry.

9. The method of manufacture according to claim 1, wherein the method further comprises heating and pressing the first and second layers to diffusion bond the first and second layers together to form an integral structure.

10. The method of manufacture according to claim 1, wherein the method further comprises one or more of placing the first and second layers between appropriately shaped dies; heating the first and second layers and dies; and supplying a pressurised fluid between the first and second layers to cause at least one of the first and second layers to be superplastically formed.

11. The method of manufacture according to claim 1, wherein the method further comprises finishing the outer facing surfaces of the first and/or second layers.

\* \* \* \* \*